3,418,346
COMPLEXES OF DECABORANE, SELECTED METALS, AND PHOSPHINES, ARSINES, OR SULFIDES
George W. Parshall, Wilmington, Del., assignor to E. I. du Pont de Nemours and Company, Wilmington, Del.
No Drawing. Filed Oct. 11, 1966, Ser. No. 585,750
8 Claims. (Cl. 260—429)

This invention relates to novel organometallic compounds. More specifically, the invention concerns complexes of decaborane with certain transition metals and certain phosphines, arsines, or sulfides, and to methods for their preparation.

The novel complexes of the invention are compounds represented by the general formula $$L_2M(B_{10}H_{12})$$

wherein M is selected from platinum and palladium; and L is selected from $R_3P$, $R_3As$ or $R_2S$ where each R is hydrocarbyl free of aliphatic unsaturation and is of up to 10 carbon atoms, and wherein two R groups on the same or different hetero-atoms can be covalently joined together.

The term "hydrocarbyl free of aliphatic unsaturation" is defined as meaning that the hydrocarbyl groups are aliphatically saturated, i.e., they do not contain aliphatic double or triple bonds, but they may contain aromatic unsaturation. Thus, terms included in the definition are alkyl, cycloalkyl, aryl, alkaryl, aralkyl and when two R groups are joined together, alkylene or phenylene. Preferably, the R groups are alkyl or aryl.

Since the compounds contain two L groups, an R group of one L may be joined together with an R group of the other L, so that both L groups may be represented as $R_2P$—R—$PR_2$, $R_2As$—R—$AsR_2$ or RS—R—SR. Here, the bridging R, which can be designated as R′, is preferably alkylene or phenylene of up to 6 carbon atoms.

Representative L groups include trimethylphosphine, tributylphosphine, trioctylphosphine, triphenylphosphine, P,P,P′,P′ - tetraphenylethylenediphosphine, trinaphthylphosphine, tri-p-tolylphosphine, tribenzylphosphine, methyldicyclohexylphosphine, trimethylarsine, tridecylarsine, tripropylarsine, triphenylarsine, tribenzylarsine, diethylcyclopentylarsine, trixylylarsine, dimethylsulfide, dihexylsulfide, dinonylsulfide, diphenylsulfide, dinaphthylsulfide, dibenzylsulfide, di-p-tolylsulfide, tetramethylene sulfide, As,As,As′,As′-tetramethyl-o-phenylenediarsine, and the like.

The compounds of this invention are prepared by reacting an alkali metal decaborane derivative selected from the formulas $M'B_{10}H_{13}$ or $M_2'B_{10}H_{14}$ wherein M′ is an alkali metal (preferably sodium or potassium) with a bis(ligand) metal salt of the formula $L_2MY_a$ wherein L and M are defined as above; Y is an anion of valence 1- or 2-; $a$ is a cardinal number selected from 1 and 2; $a$ being 1 when Y is divalent and $a$ being 2 when Y is a monovalent anion other than $BH_4^-$. Y is preferably the anion of a strong acid, e.g., halogen, sulfate, or nitrate; or $BH_4^-$. The reaction is carried out at a temperature of between 0° and 150° C. (preferably between 20° and 80° C.) in a liquid reaction medium. The reactants are mixed in solution form; thus the reaction medium will be the solvent or solvents in which the reactants are dissolved.

Solvents for the alkali metal decaborane derivatives include substantially anhydrous ethers or aliphatically saturated hydrocarbons, e.g., diethyl ether, diphenyl ether, anisole, the dimethyl ether of ethylene glycol, benzene, xylene, heptane, and the like. Preferred solvents include diethyl ether, tetrahydrofuran, and the dimethyl ether of ethylene glycol.

Suitable solvents for the bis(ligand) metal salts include ethers, alcohols, ketones, aliphatic or aromatic hydrocarbons and nitriles, e.g., diphenyl ether, ethyl alcohol, isopropyl alcohol, acetone, heptane, decane, benzene, toluene, acetonitrile, and the like. Preferred solvents are benzene, ethyl alcohol, and acetonitrile.

The proportions of the alkali metal decaborane derivative and the bis(ligand) metal salt in the above process can vary widely, i.e., from a ratio of 1:1 to 10:1 are operable. However, it is preferred that the ratio lie between 1.1:1 and 3:1.

Pressure is not critical and atmospheric pressure is used for convenience. Nor is time critical, but for optimum yield, times of ½ to 3 hours are usually employed.

The alkali metal decaborane derivatives and bis(ligand) metal salts are known compounds that can be prepared by methods described in the literature. For example, $NaB_{10}H_{13}$ can be made by the procedure described by N. J. Blay et al. in J. Cem. Soc., 1962, 3416. $Na_2B_{10}H_{14}$ can be made directly from decaborane(14) and sodium metal in liquid ammonia, but a more convenient method involves converting $Cs_2B_{10}H_{14}$ [E. L. Muetterties, Inorg. Chem., 2, 647 (1963)] to $Na_2B_{10}H_{14}$ by an ion exchange procedure.

The solution of the alkali metal decaborane derivative $M'B_{10}H_{13}$ used in the process can be the reaction mixture obtained by reaction of one mole of alkali metal hydride, e.g., sodium hydride, with one mole of decaborane(14) in diethyl ether. Likewise, the solution of the alkali metal hydrocarborane(14), $M'_4B_{10}H_{14}$, can be used directly as one of the reactants in the above process.

The compounds of this invention in which M is platinum can also be prepared by the reaction of a platinum hydride of the formula $L_2'PtHX$, where L′ has the meaning defined previously for L, except that two R groups covalently joined together must be on the same hetero atom; and X is chlorine, bromine, or iodine, with decaborane(14) in an inert solvent at a temperature of 50° to 150° C. The proportions of decaborane(14) and platinum hydride can vary widely. The ratios of decaborane to the platinum hydride can range from 100:1 to 1:100, although the preferred ratio is about 1:2. Ambient pressures are satisfactory for carrying out the reaction when the reaction temperature is below the boiling point of the solvent. When reaction temperatures above the boiling point of the solvent are used, superatmospheric pressures are employed, usually 1–3 atmospheres.

Solvents that are operable in this process include aliphatic and aromatic ethers and aliphatic and aromatic hydrocarbons, e.g., diphenyl ether, diethyl ether, diisopropyl ether, dioxane, anisole, the dimethyl ether of ethylene glycol, the dimethyl ether of triethylene glycol, xylene, benzene, ethylbenzene, and heptane. The preferred solvents are benzene and toluene.

The reactants in this process, i.e., decarborane(14) and the platinum hydrides $L_2'PtHX$, are known compounds, and their preparation is described in the literature.

The products of both processes can be worked up and purified by conventional techniques, e.g., crystallization and extraction.

The novel compounds of this invention are crystalline solids that are stable in air, are diamagnetic, have low solubility in most organic solvents, and have direct metal-to-boron bonds.

The products and processes of this invention are illustrated in further detail by the following examples, but are not intended to be limited to the example disclosures.

EXAMPLE I

A solution of 0.1 g. of decaborane(14) in 1 ml. of benzene was treated with an equal weight of trans-chlorohydridobis(triethylphosphine)platinum(II) and two drops of acetonitrile.

On warming the mixture became bright yellow. The solution was filtered to remove a haze and the filtrate was evaporated. The residual yellow oil crystallized when it was washed with hexane.

Extraction with benzene followed by cooling gave light yellow crystals of $(Et_3P)_2PtB_{10}H_{12}$. The solid did not melt up to 210° C., but blackened and decomposed. It was insoluble in water and aqueous NaOH, but decomposed with darkening in warm 10% NaOH.

EXAMPLE II

A clear, almost colorless solution of 1.22 g. of decaborane(14) and 4.68 g. of $HPtCl(PEt_3)_2$ (0.01 mole of each) in 35 ml. of benzene was stirred in an evacuated reaction flask with condenser and manometer. The flask was heated with an oil bath for about 20 minutes with bath temperature increasing to 69° C. Nitrogen was admitted to bring the pressure to 280 mm. The flask was heated at 60–80° C. for an additional 160 minutes. Gas was evolved and the solution became yellow. The reaction mixture was cooled and filtered. The pale yellow, crystalline $(Et_3P)_2PtB_{10}H_{12}$ was washed with acetone and after drying the yield was 0.45 g. Additional product crystallized on standing.

The crude product was recrystallized from acetone to give yellow crystals. They were dried at 56° C./0.1 mm./2 hr.

*Analysis.*—Calcd. for $C_{12}H_{42}B_{10}P_2Pt$: C, 26.1%; H, 7.7%; B, 19.6%; P, 11.2%; Pt, 35.4%. Found: C, 25.9%; H, 7.8%; B, 19.8%; P, 11.1%; Pt, 35.1%.

The molecular weight was determined ebullioscopically in acetone on another sample prepared as described above. Calcd. 552. Found 537. The ultraviolet spectrum in $CH_2Cl_2$ contained shoulders at 2450 and 3650 A. The infrared spectrum of a "Nujol" mull showed very complex terminal B-H stretching absorption at 2575, 2560, 2540 (S), 2520 (S), 2500 and 2490 cm.$^{-1}$ and a band at 1540 cm.$^{-1}$ probably assignable to a B-H-B bridge. Strong bands at 625, 720, and 760 cm.$^{-1}$ were assignable to the coordinated triethylphosphine ligands. The $H^1$ N.M.R. spectrum in acetone-$d_6$ contained complex absorption at 8.86 and 7.8τ assignable to $CH_3$ and $CH_2$ groups respectively. Broad unresolved peaks assignable to BH groups appeared to be centered at ca. 5 and 8τ.

EXAMPLE III

A solution of 0.24 g. of decaborane(14) in 50 ml. of ether was stirred with ca. 0.5 g. of sodium hydride (56% in mineral oil). The yellow mixture was filtered and 0.5 g. of cis-$(Et_3P)_2PtCl_2$ in 50 ml. of acetonitrile was added to the filtrate. The mixture was stirred for one hour. The yellow solution was filtered and was evaporated to dryness. The residue was washed with hexane and was recrystallized from 40 ml. of acetonitrile to give yellow crystals of $(Et_3P)_2PtB_{10}H_{12}$. The infrared spectrum was identical with a spectrum of $(Et_3P)_2PtB_{10}H_{12}$ prepared by the method of Example II. The solid darkens progressively above 180° C. without melting.

*Analysis.*—Calcd. for $C_{12}H_{42}B_{10}P_2Pt$: C, 26.1%; H, 7.7%; B, 19.6%; P, 11.2%; Pt, 35.4%. Found: C, 26.9%; H, 7.8%; B, 19.7%; P, 10.7%; Pt, 36.1%.

EXAMPLE IV

An $NaB_{10}H_{13}$ solution was prepared from 0.61 g. of decaborane(14) and 0.42 g. of 58% sodium hydride in 50 ml. of ether, and was added to a solution of 3.2 g. of cis-dichlorobis(tributylphosphine)platinum in 40 ml. of tetrahydrofuran. The mixture became cloudy and NaCl crystallized as the mixture was stirred at 25° C. for 30 minutes.

The solution was filtered and the filtrate was evaporated to a yellow oil. Trituration with ligroin gave a yellow solid. Recrystallizations from benzene and hexane successively gave yellow crystals, yield 1.0 g., M.P. 182–183° C.

*Analysis.*—Calcd. for $C_{24}H_{54}B_{10}P_2Pt$: C, 40.0%; H, 9.2%; B, 15.0%. Found: C, 40.3%; H, 9.1%; B, 14.8%.

The $B^{11}$ N.M.R. spectrum of a 20% solution in acetone showed two major peaks in a ratio of 1:4. The smaller peak was a doublet (J=142 c.p.s.) centered at +46.2 p.p.m. from methyl borate as an external reference. The larger peak centered at +10 p.p.m. was broad and unresolved.

EXAMPLE V

A solution of 0.48 g. of decaborane(14) in 70 ml. of ether was stirred with 3.5 ml. of 1.6 M butyllithium solution in ether. The final solution was faintly yellow. A solution of 2.0 g. of cis-$(Et_3P)_2PtCl_2$ in 50 ml. of acetonitrile was added. The color deepened to dark yellow and a white precipitate was obtained. The precipitate was identified as LiCl (0.2 g). The filtrate was evaporated to dryness, and the residue was recrystallized from acetonitrile to give 0.5 g. (22%) of $(Et_3P)_2PtB_{10}H_{12}$. The infrared spectrum was identical to that of the product from Example III.

EXAMPLE VI

A suspension of 1.15 g. (2.0 mmole) of dichloro-(P,P,P′,P′ - tetraphenylethylenediphosphine)palladium (II) in 30 ml. of tetrahydrofuran was treated with 20 ml. (4.0 mmole) of $NaB_{10}H_{13}$ solution in ether. The mixture became yellow, but turned nearly white in the course of 3 hours at 25° C. The mixture was filtered and the filtrate was evaporated. The off-white solid residue was recrystallized from acetone. The first crop of $[Ph_2P(CH_2)_2PPh_2]PdB_{10}H_{12}$ consisted of pale yellow needles which decomposed at 230–240° C. A second crop was off-white needles which behaved similarly. The infrared spectra showed both BH and aryl functions.

*Analysis.*—Calcd. for $C_{26}H_{36}B_{10}P_2Pd$: C, 49.9%; H, 5.8%. Found: C, 50.5%; H, 6.8%.

EXAMPLE VII

A suspension of 0.79 g. (1.0 mmole) of cis-dichlorobis(triphenylphosphine)platinum(II) in 20 ml. of tetrahydrofuran was treated with 10 ml. (2.0 mmole) of $NaB_{10}H_{13}$ solution in ether. The mixture became yellow. After 3 hours, it was filtered and the solid, mainly sodium chloride, was washed with hot acetone. Evaporation of the filtrate gave a yellow oil which crystallized on trituration with acetone. Recrystallization from acetone gave bright yellow crystals of $[(C_6H_5)_3P]_2PtB_{10}H_{12}$ which decomposed without melting at ca. 200° C.

*Analysis.*—Calcd. for $C_{36}H_{42}B_{10}P_2Pt$: C, 51.5%; H, 5.0%. Found: C, 52.4%; H, 5.4%.

Examples of specific complexes, besides those mentioned in Examples I–VII that are included in the invention, are listed in the following table. This table also lists the corresponding reactants, which, when substituted for the reactants in Examples I–VII and the reactions are carried out by the procedures of these examples, give the listed products.

TABLE

| Reactants | | Product |
|---|---|---|
| Decaborane (or derivative) | Metal salt | |
| Decaborane(14) | $[(C_8H_{17})_3P]_2PtHBr$ | $[(C_8H_{17})_3P]_2PtB_{10}H_{12}$ |
| Do | $[(C_6H_5)_3P]_2PtHI$ | $[(C_6H_5)_3P]_2PtB_{10}H_{12}$ |
| Do | $[(\alpha\text{-}C_{10}H_7)_3P]_2PtHCl$ | $[(\alpha\text{-}C_{10}H_7)_3P]_2PtB_{10}H_{12}$ |
| $KB_{10}H_{13}$ | $[(CH_3)_3P]_2PtCl_2$ | $[(CH_3)_3P]_2PtB_{10}H_{12}$ |
| $NaB_{10}H_{13}$ | $[(C_2H_5)_3As]_2PtBr_2$ | $[(C_2H_5)_3As]_2PtB_{10}H_{12}$ |
| $LiB_{10}H_{13}$ | $[(C_6H_5)_3As]_2PtI_2$ | $[(C_6H_5)_3As]_2PtB_{10}H_{12}$ |
| $NaB_{10}H_{13}$ | $[(C_6H_{11})_3As]_2PdCl_2$ | $[(C_6H_{11})_3As]_2PdB_{10}H_{12}$ |
| $NaB_{10}H_{13}$ | $[(C_5H_{11})_3As]_2PdBr_2$ | $[(C_5H_{11})_3As]_2PdB_{10}H_{12}$ |
| $Na_2B_{10}H_{14}$ | $[(CH_3)_2S]_2PdCl_2$ | $[(CH_3)_2S]_2PdB_{10}H_{12}$ |
| $Na_2B_{10}H_{14}$ | $[(C_2H_5)_2S]_2Pt(SCN)_2$ | $[(C_2H_5)_2S]_2PtB_{10}H_{12}$ |

The products of this invention are useful for various purposes. For example, the complexes of this invention are useful as developing agents for silver nitrate invisible inks. More specifically, when paper on which invisible writing has been formed by aqueous silver nitrate ink is treated with an acetone solution of $(Et_3P)_2PtB_{10}H_{12}$, the writing turns to a pink color in 1–5 minutes.

Another use for the palladium and platinum complexes of this invention is as polymerization initiators for ethylene. For example, high molecular weight polyethylene is obtained by heating $(Et_3P)_2PtB_{10}H_{12}$ or $(Bu_3P)_2PtB_{10}H_{12}$ in benzene solution with ethylene at 1000 atmospheres pressure and 150–180° C.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compositions represented by the formula $$L_2M(B_{10}H_{12})$$

wherein $(B_{10}H_{12})$ is decaborane(12); M is a metal selected from the class consisting of platinum and palladium; and L is selected from the class consisting of $R_3P$, $R_3As$, $R_2S$, $R_2P$—$R'$—$PR_2$, $R_2As$—$R'$—$AsR_2$ and $RS$—$R'$—$SR$ wherein R is hydrocarbyl free of aliphatic unsaturation and is of up to 10 carbon atoms, and wherein two R groups on the same heteroatom can be covalently joined together, and wherein R' is selected from the class consisting of alkylene and phenylene of up to 6 carbon atoms.

2. Compositions of claim 1 wherein R is selected from the class consisting of alkyl and aryl.

3. Compositions of claim 2 wherein M is platinum.

4. Compositions of claim 1 wherein L is $R_3P$ in which R is of up to 10 carbon atoms and is selected from the class consisting of alkyl and aryl; and M is platinum.

5. The composition of claim 4 having the formula $[(C_2H_5)_3P]_2Pt(B_{10}H_{12})$.

6. The composition of claim 1 having the formula $[(C_6H_5)_2P(CH_2)_2P(C_6H_5)_2]Pd(B_{10}H_{12})$.

7. Process for preparing the compositions of claim 1 which comprises reacting a compound selected from the class consisting of $M'B_{10}H_{13}$ and $M_2'B_{10}H_{14}$ wherein $M'$ is an alkali metal, with a compound of the formula $L_2MY_a$ wherein M and L are defined as in claim 1; Y is an anion derived from a strong acid, and $a$ is a cardinal number of 1–2; said reaction being carried out at a temperature of between 0° and 150° C. in the presence of a substantially anhydrous liquid reaction medium selected from the class consisting of hydrocarbon ethers and hydrocarbons free of aliphatic unsaturation.

8. Process which comprises reacting decaborane(14) with a compound of the formula $L_2'PtHX$ wherein $L'$ is selected from the class consisting of $R_3P$, $R_3As$ and $R_2S$ wherein R is hydrocarbyl free of aliphatic unsaturation and is of up to 10 carbon atoms, and wherein any two R groups on the same heteroatom can be covalently joined together; and X is selected from the class consisting of chlorine, bromine and iodine; in the presence of an inert solvent at a temperature of between 50° and 150° C.

References Cited

UNITED STATES PATENTS 2,993,751    7/1961    Edwards et al.

TOBIAS E. LEVOW, *Primary Examiner.*

A. P. DEMERS, *Assistant Examiner.*

U.S. Cl. X.R.

106—1, 21; 174—68.5; 252—431; 260—94.9, 440, 606.5, 327; 23—361